(12) United States Patent
Glasser

(10) Patent No.: US 10,111,410 B2
(45) Date of Patent: Oct. 30, 2018

(54) LEASH ATTACHABLE PORTAGE AND STORAGE APPARATUS

(71) Applicant: Mirit Glasser, Montclair, NJ (US)

(72) Inventor: Mirit Glasser, Montclair, NJ (US)

( * ) Notice: Subject to any disclaimer, the term of this patent is extended or adjusted under 35 U.S.C. 154(b) by 179 days.

(21) Appl. No.: 15/420,451

(22) Filed: Jan. 31, 2017

(65) Prior Publication Data

US 2018/0213749 A1 Aug. 2, 2018

(51) Int. Cl.
| | | |
|---|---|---|
| *A01K 27/00* | (2006.01) | |
| *B65D 21/02* | (2006.01) | |
| *B65D 25/42* | (2006.01) | |
| *B65D 41/04* | (2006.01) | |
| *B65D 25/28* | (2006.01) | |
| *A01K 7/00* | (2006.01) | |
| *A01K 5/00* | (2006.01) | |

(52) U.S. Cl.
CPC ............... *A01K 27/008* (2013.01); *A01K 5/00* (2013.01); *A01K 7/00* (2013.01); *B65D 21/0233* (2013.01); *B65D 25/2802* (2013.01); *B65D 25/42* (2013.01); *B65D 41/04* (2013.01)

(58) Field of Classification Search
CPC .......... A01K 27/008; A01K 5/00; A01K 5/01; A01K 5/0107; A01K 7/00; B65D 21/023; B65D 21/00; B65D 69/00
See application file for complete search history.

(56) References Cited

U.S. PATENT DOCUMENTS

| | | | | |
|---|---|---|---|---|
| 8,256,379 B2* | 9/2012 | Rabello | ................ | A01K 27/004 119/51.5 |
| 8,342,349 B2* | 1/2013 | Lu | ........................ | A47J 41/00 206/508 |
| 8,783,482 B2* | 7/2014 | Bou Mezrag | ...... | B65D 21/0231 206/505 |
| 9,120,598 B2* | 9/2015 | Meyers | ................ | B65D 21/022 |
| 10,039,422 B2* | 8/2018 | Fouad | ..................... | A47J 43/27 |
| 10,046,881 B2* | 8/2018 | Saito | .................. | B65D 21/0231 |
| 2013/0140211 A1* | 6/2013 | Robbins, III | ............ | A45F 3/20 206/517 |
| 2017/0190458 A1* | 7/2017 | Tinsley | ................ | B65D 1/0261 |
| 2017/0361984 A1* | 12/2017 | Fouad | ..................... | A47J 43/27 |

* cited by examiner

*Primary Examiner* — Kristen C Hayes
(74) *Attorney, Agent, or Firm* — Williams Intellectual Property; Benjamin F. Williams

(57) ABSTRACT

A leash attachable portage and storage apparatus includes an upper portion securable to a reservoir portion and at least one bowl member. The reservoir portion is disposed to nest into the upper portion and the at least one bowl member is secures to the upper portion around the reservoir portion to contain the reservoir portion therein. Fluids are storable and portable within the reservoir portion and decantable into the at least one bowl member. The at least one bowl member may include a first bowl and a second bowl. Additional items, such as foodstuffs and treats for reward, are portable in the second bowl. Additional bowls may be attached to the device and portage of personal effects and accouterments is thereby enabled in a compact array manually wieldable to control an animal tethered to the apparatus.

11 Claims, 5 Drawing Sheets

LEASH ATTACHABLE PORTAGE AND STORAGE APPARATUS

BACKGROUND OF THE INVENTION

Walking a pet often requires access to additional accouterments, such as treats, water, collars, tags, and other personal effects, as desired. Undertaking prolonged walks, such as a day hike or multi-day hike, likewise requires porting additional elements usable upon demand. A means of porting foodstuffs and liquids to rehydrate a pet during such walks is desirable and the present state of the art employs carriage of such items upon the pet itself whereby the pet carries its own food and water. Most leashes occupy space without providing additional storage potential. The present invention provides for a leash attachable portage and storage apparatus that enables nested components securable to an upper portion whereby foodstuffs, water, and personal effects, among other items and accouterments as desired, are portable in separate containers and manual control over a pet, tethered to the upper portion upon an existing leash, is increased.

FIELD OF THE INVENTION

The present invention relates to a leash attachable portage and storage apparatus, and more particularly, to a leash attachable portage and storage apparatus that includes a reservoir portion and at least one bowl member devised for nesting engagment into an upper portion for compact portage and storage of fluids and items. A handle member is disposed spanning a top surface of the upper portion, said handle member devised for comfortable grasping by a user and therefore greater control over a pet tethered by an existing leash to an attachment member disposed anteriorly projected from the upper portion proximal a circular edge thereof.

The reservoir portion is attachable to the upper portion and devised to nest into the upper portion underlying a domic top surface of said upper portion. The at least one bowl member also secures to the upper portion overlying the reservoir portion, said reservoir portion disposed engaged within the cavity of the at least one bowl member. The at least one bowl member is readily detachable and presentable to a pet, and fluid stored in the reservoir portion is decantable into the at least one bowl member for consumption by the pet, as desired.

In a preferred embodiment herein disclosed, the at least one bowl member includes each of a first bowl and a second bowl. The first and second bowl may be identical, and additional bowls may be attached in like manner as described hereinbelow.

SUMMARY OF THE INVENTION

The present leash attachable portage and storage apparatus has been devised to enable a convenient means of storing and transporting water, treats, and personal effects in a convenient, compact arrangement while walking a pet. The present leash attachable portage and storage apparatus enables manual wielding by a user and attachment to a pet, whereby the user may wield the device in lieu of a handle on an existing leash to control a pet tethered to the apparatus, as will be set forth below. Additionally, the present apparatus enables expedient deployment of fluids and treats to rehydrate and reward a pet during a walk.

The present leash attachable portage and storage apparatus, therefore, includes an upper portion devised to accommodate a reservoir portion nestled thereto, and at least one bowl member disposed to encapsulate the reservoir portion and securably attach to the upper portion. Liquids stored in the reservoir portion are thus decantable from the reservoir portion into the at least one bowl, when detached, for rehydration of an animal during walks.

The upper portion includes a domic top surface, a circular edge bounding the top surface, and a cylindrical portion perpendicularly disposed underlying the top surface proximal the circular edge. Top surface is configured to accommodate the reservoir portion in immediate contact thereunder. An aperture is disposed in the top surface accommodative of a spout member disposed upon the reservoir portion, whereby nesting of the reservoir into the upper portion enables positioning of the spout member through the aperture.

The reservoir portion includes a hollow body member having at least one mating member disposed thereupon. The at least one mating member is disposed to effect securable seating of the reservoir portion into the upper portion. In an example embodiment depicted herein, the at least one mating member is a circular indentation disposed roundabout the reservoir portion, there configured to mate into an inner thread track disposed interiorly circumferentially upon the cylindrical portion. The at least one mating member mechanically snaps into position engaged by the inner thread track disposed upon the cylindrical member.

Securement of the reservoir portion is further effected by action of the at least one bowl member disposed to secure underneath the reservoir portion hollow body member, whereby the hollow body member of the reservoir portion is nested into the concavity of the at least one bowl member. The at least one bowl member includes an inner thread track disposed interiorly circumferentially upon said at least one bowl member, whereby the at least one bowl member is securable to an outer thread track disposed exteriorly circumferentially upon the cylindrical portion. In the example embodiment depicted herein, securement of the at least one bowl member to the upper portion is effective by rotational engagement of said inner and outer thread tracks disposed to mate when rotated relative one another.

In the example embodiment disclosed herein, the at least one bowl member includes a first bowl and a second bowl, each of which first and second bowls are devised to nest into each other in like fashion as attach to the cylindrical portion of the upper portion. The first bowl thus attaches to the upper portion in the manner previously described and the second bowl attaches to the first bowl by engagement of n inner thread track to an outer thread track disposed exteriorly circumferentially upon the first bowl. Additional bowls are contemplated as attachable in like manner.

A cap member is attachable to enclose the spout member of the reservoir portion. The cap member may include a diameter greater than the diameter of the aperture in the top surface whereby connection of the cap member to the reservoir portion provides additional securement of the reservoir portion nested into the upper portion. The reservoir portion may therefore be securable into the upper portion in at least three ways; by engagement of the at least one mating member into the inner thread track disposed upon the cylindrical portion; by engagement inside the concavity of the at least one bowl member secured to the upper portion; and by action of the cap member positioned enclosing the spout member. Thus the reservoir portion is securable into the upper portion and maintainable in position even when the cap member and at least one bowl member are removed.

Attachment to an animal is effective by action of an attachment member disposed to protrude anteriorly out the upper portion proximal the circular edge. The attachment member includes a parallelepiped body portion and an anchor portion. The body portion is disposed for securable engagement interior to a hollow base portion disposed underlying a handle member, said handle member disposed spanning the top surface of the upper portion, whereby the anchor portion is disposed anteriorly projected out from the upper portion proximal the circular edge. An eyelet is disposed in the anchor portion for linking engagement with an existing leash whereby a pet may be tethered to the upper portion.

A user, therefore, is enabled wielding of the device to control an animal while walking said animal, by manual action at the handle member. A molded overlay disposed upon the handle is contemplated to provide comfort and tactility when wielding the device. Greater control is thus exerted over the animal tethered to the device, and comfort is increased as the handle member enables conformability at the molded overlay and a greater area for grasping relative handles common to existing leashes seen in the art. This is particularly useful when walking larger pets (such as great danes, pit bulls, newfoundlands, or other larger dogs, for example, able to exert considerable tension to a leash and actually accelerate a user holding the leash).

Liquids are thus storable and portable within the reservoir portion for use when taking an animal on a walk. Foodstuffs and treats are likewise storable and portable in the at least one bowl member. Addition of additional bowls (such as the second bowl, for example) enables storage and portage of personal effects in separate condition relative goods and items ported in the first bowl, for example. Thus a user may port a variety of useful items in compact and convenient array when walking an animal, as desired.

A user may, therefore, enjoy greater comfort when walking an animal and provide for hydration of the animal, treats to reward desired behavior, and foodstuffs during the walk (particularly if undertaking a day hike, for example, or walks of more prolonged duration). Use of nesting components engenders a compact and convenient storage of various items, in separate compartments. A user may, for example, detach the second bowl, remove the cap member from the reservoir portion, decant some water for a dog, for example, and them remove the first bowl to provide for food stored therein. Both food and water are therefore servable to an animal during a walk and each of the first and second bowls, and any additional bowl as may be added to thereto, are further usable as separable containers to delimit effects and items therein.

Thus has been broadly outlined the more important features of the present leash attachable portage and storage apparatus so that the detailed description thereof that follows may be better understood and in order that the present contribution to the art may be better appreciated.

Objects of the present leash attachable portage and storage apparatus, along with various novel features that characterize the invention are particularly pointed out in the claims forming a part of this disclosure. For better understanding of the leash attachable portage and storage apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
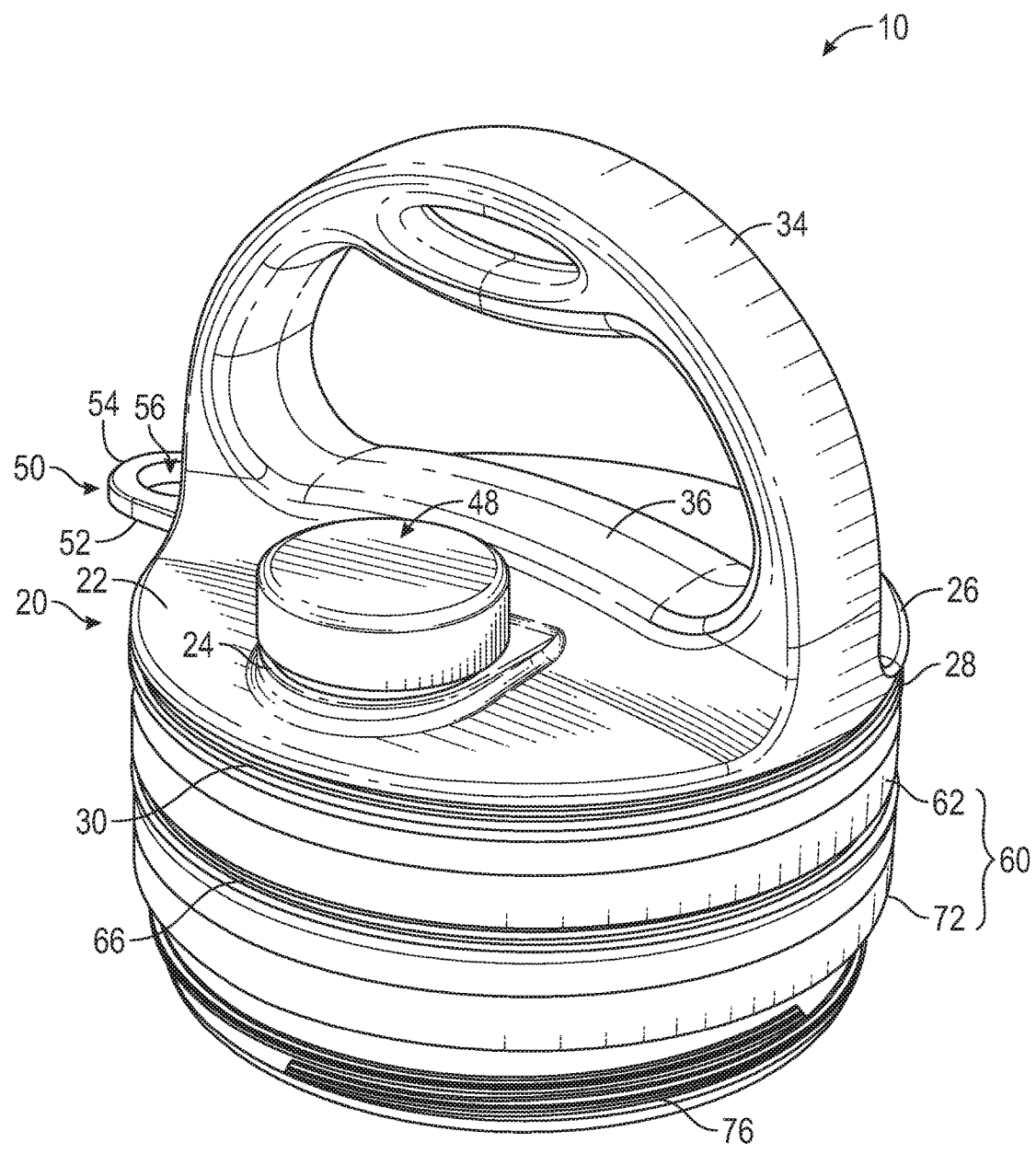
FIG. 1 is an isometric view of an example embodiment.
Figure 2:
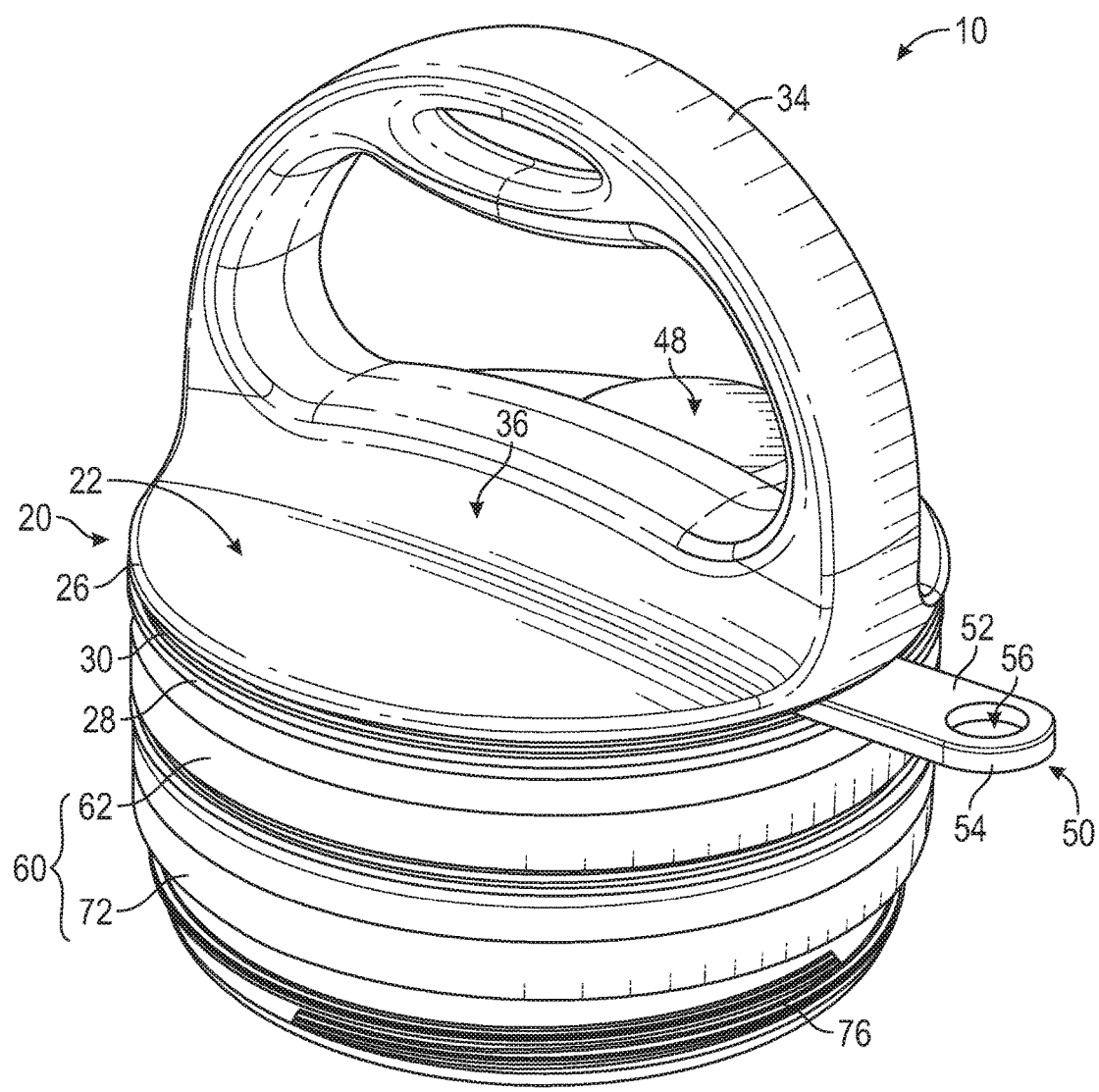
FIG. 2 is an isometric view of an example embodiment.
Figure 3:
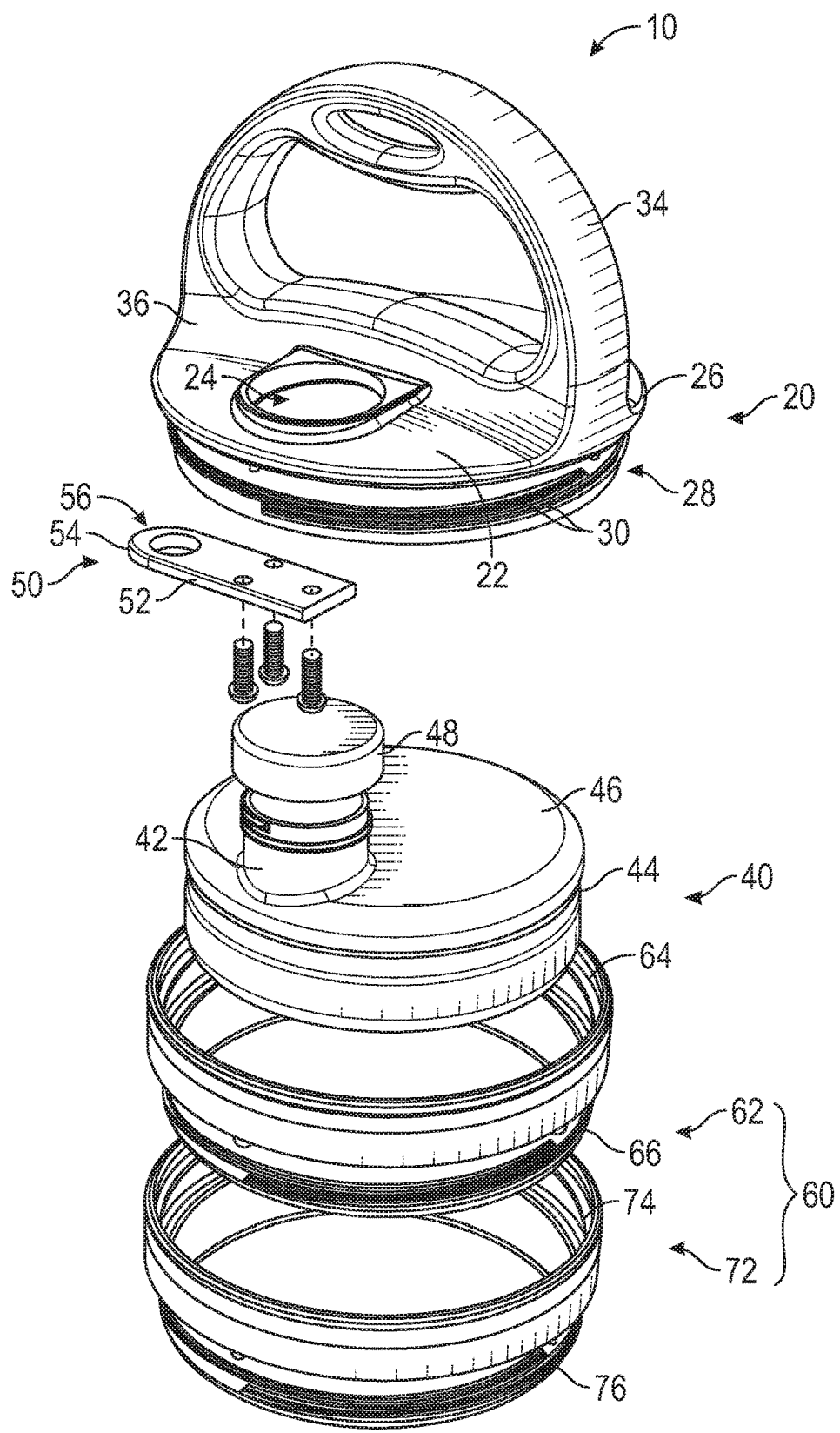
FIG. 3 is an exploded view of an example embodiment.
Figure 4:
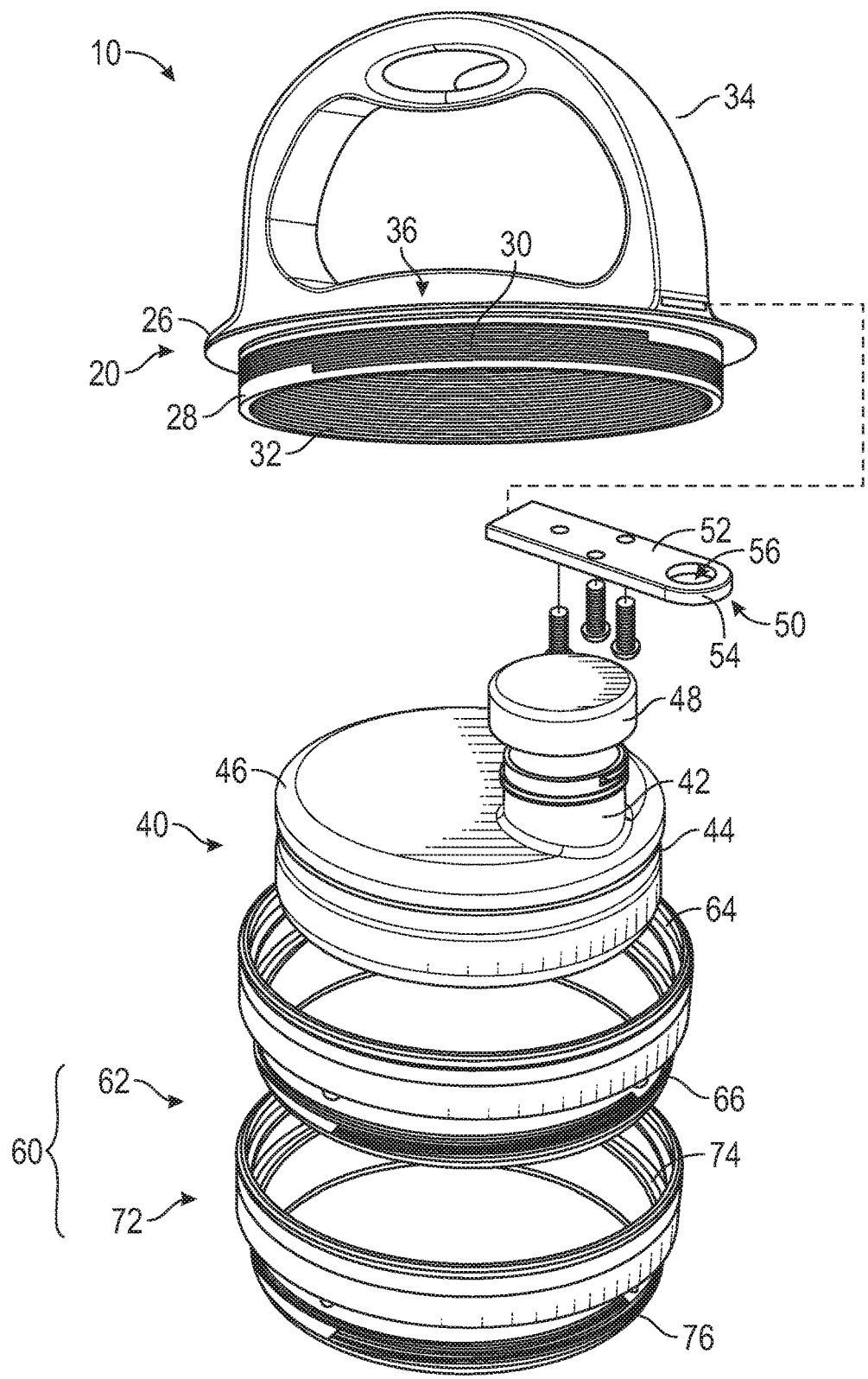
FIG. 4 is an exploded view of an example embodiment.
Figure 5:
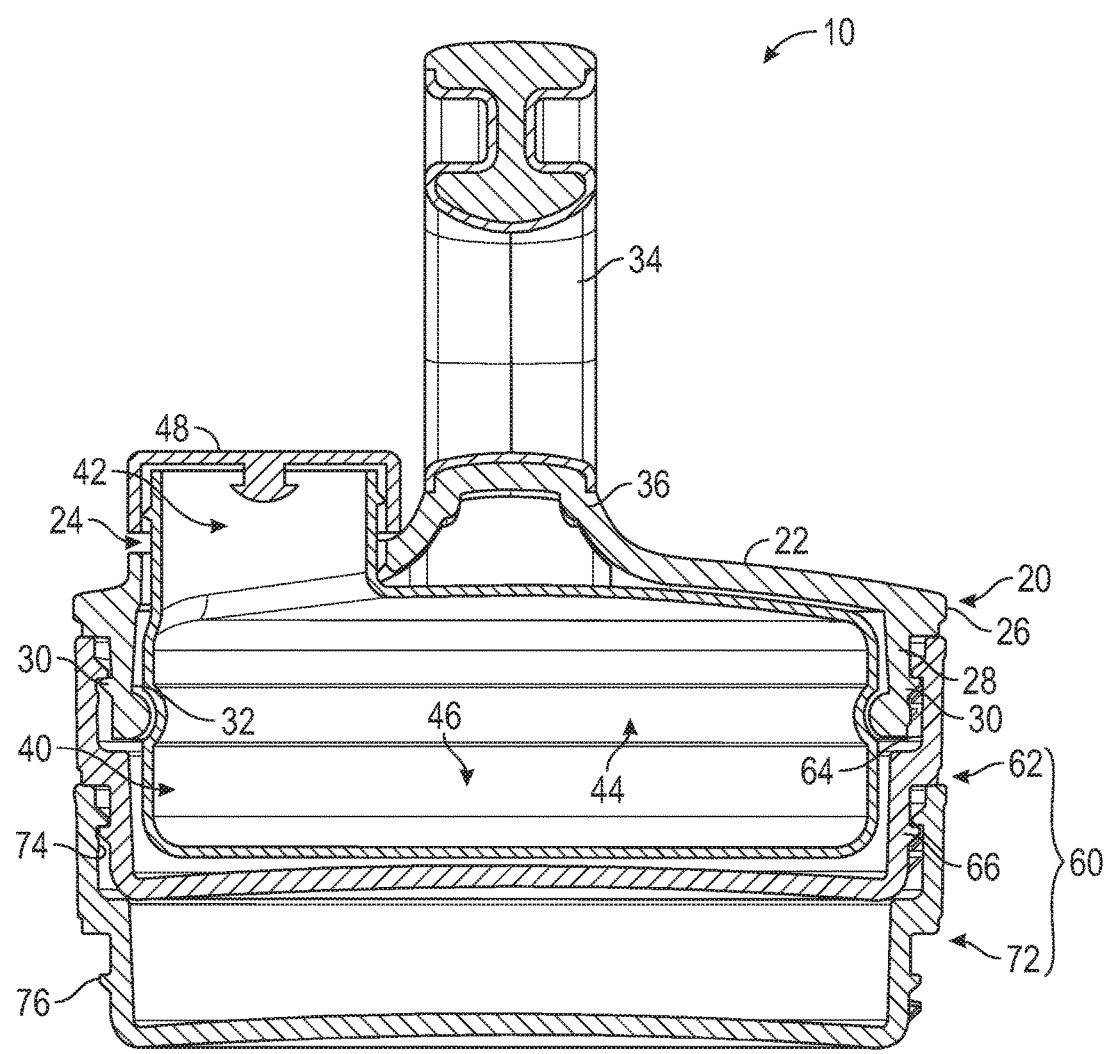
FIG. 5 is a longitudinal cross-section view of an example embodiment.

With reference now to the drawings, and in particular FIGS. 1 through 5 thereof, example of the instant leash attachable portage and storage apparatus employing the principles and concepts of the present leash attachable portage and storage apparatus and generally designated by the reference number 10 will be described.

Referring to FIGS. 1 through 5 a preferred embodiment of the present leash attachable portage and storage apparatus 10 is illustrated.

The present leash attachable portage and storage apparatus 10 has been devised to enable convenient portage of accouterments, liquids, and treats, among other items desirable to keep about the person when walking a pet.

The present leash attachable portage and storage apparatus 10 includes a graspable upper portion 20 interconnectable with a reservoir portion 40 and at least one bowl member 60. In the example embodiment herein disclosed, the at least one bowl member 60 includes a first bowl 62 and a second bowl 72, which first and second bowls 62, 72 nest together securably to enclose the reservoir portion 40 when secured to the upper portion 20, as will be described below. As will be recognized by anyone having ordinary skill in the art, it is contemplated that additional bowls may be attachable in like manner as will be set forth herein. Accouterments, such as keys, toys, and other items, are storable in the one of the first and second bowls 62, 72, and treats are storable in the other of said bowls, while water is storable and decantable from the reservoir portion 40 whereby a pet may be rehydrated and rewarded during a walk, say.

The upper portion 20 includes a domic top surface 22 adapted to secure overtop the reservoir portion 40. The first bowl 62 thence secures around the reservoir portion 40 to the upper portion 20 to enclose the reservoir portion 40. An aperture 24 is disposed within the top surface 22 to accommodate a spout member 42, disposed upon the reservoir portion 40, as will be described subsequently.

A circular edge 26 is disposed circumferentially bounding the top surface 22 overhanging a cylindrical portion 28 perpendicularly disposed underlying the upper edge 26. An outer thread track 30 is disposed exteriorly around the cylindrical portion 28 for mating engagement with an inner track member 64 disposed interiorly upon the at least one bowl member 60. An inner thread track 32 disposed interiorly around the cylindrical portion 28 is disposed to engage with a mating member 44 disposed exteriorly about the reservoir portion 40. For ready portage, a bowed handle member 34 is disposed spanning overtop the upper surface 22. The handle member 34 has a hollow base portion 36 disposed atop the upper surface 22.

An attachment member 50 is disposed upon the upper portion 20 at the hollow base portion 36 of the handle member 34. The attachment member 50 includes a parallelepiped body portion 52, securable into the hollow base portion 36 of the handle member 38, and there disposed to protrude an anchor portion 54 anteriorly out the upper portion 20 proximal the circular edge 26. An eyelet 56 is encircled within the anchor portion 54, said eyelet 56 adapted for linking engagement with an existing leash whereby an animal is tetherable to the attachment member 50.

The closable reservoir 40 is disposed for nesting engagement into the upper portion 20, accommodated by the domic top surface 22 and the cylindrical portion 28 of the upper portion 20. The reservoir portion 40 includes a hollow body member 46 having an open-topped spout member 42 disposed thereatop, said spout member 42 disposed to protrude through the aperture 24 of the upper portion 20. A cap member 48 is securable to sealably enclose the spout member 42 and contain fluids stored therein.

The at least one mating member 44 is disposed exteriorly circumferentially upon the reservoir portion 40, said at least one mating member 44 disposed for securable engagement into the inner thread track 32 of the upper portion 20 whereby the reservoir portion 40 is securable into the upper portion 20. Mating engagement between the inner thread track 32 and the mating member 44 may be effective by threaded engagement, snapping engagement, or by other mechanical means effective to positionally maintain situation of the reservoir portion 40 interior to the upper portion 20 as desired.

The first bowl 62 is disposed for nesting engagement around the reservoir portion 40 and interconnection with the outer thread track 30 disposed exteriorly upon the cylindrical portion 28 of the upper portion 20. The first bowl 62 therefore includes an inner thread track 64 disposed interiorly circumferentially thereupon, said inner thread track 64 disposed for interconnection and securable engagement with the outer thread track 30 of the upper portion 20. The first bowl 62 is thus securable to the upper portion 20 to encapsulate the reservoir portion 40, when attached to the upper portion 20, within the concavity of said first bowl 62.

A second bowl 72 is likewise nestable around the first bowl 62 and securable thereabouts by action of an inner thread track 74, disposed interiorly upon said second bowl 72, connectable to a corresponding outer thread track 66 disposed exteriorly circumferentially upon the first bowl 62. Thus the second bowl 72 is securable to the first bowl 62 in compact arrangement, the first bowl 62 fitted to the concavity of the second bowl 72, whereby a user may port additional items in separate containers, such as, for example, treats in the first bowl and other accouterments (such as keys, for example) in the second bowl 72. Additionally a user may detach the second bowl 74, leaving the first bowl 62 and reservoir portion 40 secured to the upper portion 20, remove the cap member 48, and decant liquid (such as water) into the second bowl 72 for rehydrating an animal during a walk and may thence use the first bowl 62 for food, for example. Additional bowls (not shown) may be attached in like manner to an outer thread track 76 disposed exteriorly circumferentially upon the second bowl 72.

Thus the present leash attachable portage and storage apparatus 10 enables a to user to port and store accouterments, dry goods, treats, and water, for example, when walking an animal. The present leash attachable portage and storage apparatus 10, by making use of nesting configurations of component parts, enables a compact profile for use when walking an animal and enables expedient disassembly for access to the first and second bowls 62, 72 for feeding and watering the animal, as desired. Additionally, each of the first and second bowls 62, 72 enables distinct and separate carriage of various items which prudence may suggest remain apart, such as, for example, personal effects and dry goods which, if comingled in an area of same storage, would contaminate each other.

What is claimed is:

1. A leash attachable portage and storage apparatus comprising:
    a graspable upper portion;
    an attachment member disposed upon the upper portion, said attachment member having an eyelet adapted for linking engagement with an existing leash;
    a closable reservoir portion disposed for nesting engagement into the upper portion; and
    at least one bowl member disposed for nesting engagement around the reservoir portion and securable to the upper portion;
    wherein the at least one bowl member secures the reservoir portion into the upper portion and the upper portion securely attaches to an existing leash whereby portage and storage of fluids in the reservoir portion, and dry goods in the at least one bowl member, is effective when walking a pet attached to the attachment member.

2. The leash attachable portage and storage apparatus of claim 1 wherein the reservoir portion comprises:
    a hollow body member;
    an open-topped spout member disposed atop the body member;
    a cap member securable to sealably enclose the spout member; and
    at least one mating member exteriorly upon the reservoir, said at least one mating member disposed for securable engagement into the upper portion;
    wherein the body member is fillable with fluid sealably enclosable by action of the cap member and securable into the upper portion for portage when walking a pet.

3. The leash attachable portage and storage apparatus of claim 2 wherein the upper portion includes an aperture adapted to accommodate the spout member to of the reservoir portion therethrough, said spout member thereby disposed to protrude through the upper portion when the body member of the reservoir potion is secured into said upper portion.

4. The leash attachable portage and storage apparatus of claim 3 wherein the upper portion further comprises:
    a domic top surface;
    a circular edge disposed circumferentially bounding the top surface;
    a cylindrical portion perpendicularly disposed underlying the upper edge, said upper edge overhanging the cylindrical portion;
    an outer thread track disposed exteriorly around the cylindrical portion;
    an inner thread track disposed interiorly around the cylindrical portion; and
    a bowed handle member disposed to span overtop the upper surface;
    wherein the inner thread track securably engages with the at least one mating member of the reservoir portion and the outer thread track securably engages with the at least one bowl member.

5. The leash attachable portage and storage apparatus of claim 4 wherein the cap member secures to the spout member overtop the upper portion, said cap member having a radius larger than a radius of the aperture, whereby connection of the cap member to the spout member effects securement of the reservoir portion into the upper portion in addition to the at least one mating member to forcing engagement with the interior thread track.

6. The leash attachable portage and storage apparatus of claim 5 wherein the bowed handle member includes a hollow base portion disposed atop the top surface of the upper portion.

7. The leash attachable portage and storage apparatus of claim 6 wherein the attachment member secures into the hollow base portion, said attachment member comprising:
   a parallelepiped body portion; and
   an anchor portion, said anchor portion encircling the eyelet;
   wherein body portion secures into the hollow base portion and the anchor portion protrudes anteriorly out from the upper portion proximal the circular edge of the upper portion.

8. The leash attachable portage and storage apparatus of claim 7 wherein the at least one bowl member includes a first bowl and a second bowl, said first bowl securable to the upper portion encapsulating the reservoir portion therein, said second bowl attachable around the first bowl and securable in nested configuration thereabouts.

9. The leash attachable portage and storage apparatus of claim 8 wherein the first bowl further comprises an outer thread track disposed exteriorly thereabouts and to the second bowl includes at least one mating member disposed circumferentially interiorly thereabouts, whereby the second bowl secures around the first bowl, said first bowl nested therein.

10. A leash attachable portage and storage apparatus comprising:
    a graspable upper portion comprising:
      a domic top surface;
      an aperture disposed within the top surface;
      a circular edge disposed circumferentially bounding the top surface;
      a cylindrical portion disposed perpendicularly underlying the upper edge, said upper edge overhanging the cylindrical portion;
      an outer thread track disposed exteriorly around the cylindrical portion;
      an inner thread track disposed interiorly around the cylindrical portion;
    a bowed handle member disposed to span overtop the upper surface, said handle member having a hollow base portion disposed atop the upper surface;
    an attachment member disposed upon the upper portion, said attachment member having:
      a parallelepiped body portion securable into the hollow base portion of the handle member;
      an anchor portion disposed to protrude anteriorly out the upper portion proximal the circular edge;
      an eyelet encircled within the anchor portion, said eyelet adapted for linking engagement with an existing leash;
    a closable reservoir portion disposed for nesting engagement into the upper portion, said reservoir portion comprising:
      a hollow body member;
      an open-topped spout member disposed atop the body member, said spout member disposed to protrude through the aperture of the upper portion;
      a cap member securable to sealably enclose the spout member;
      a mating member disposed exteriorly circumferentially upon the reservoir portion, said at least one mating member disposed for securable engagement into the inner thread track of the upper portion; and
    a first bowl disposed for nesting engagement around the reservoir, said at least one bowl having an inner thread track disposed interiorly circumferentially thereupon, said inner thread track disposed for securable engagement with the outer thread track of the upper portion;
    wherein the first bowl secures the reservoir portion into the upper portion and the upper portion securely attaches to an existing leash whereby portage and storage of fluids in the reservoir, and dry goods in the first bowl, is effective when walking a pet attached to the attachment member.

11. The leash attachable portage and storage apparatus of claim 10 further comprising a second bowl nestable around the first bowl and securable thereabouts by action of an inner thread track disposed upon the second bowl securably fitting to an outer thread track disposed exteriorly circumferentially upon the first bowl.

\* \* \* \* \*